United States Patent
Thompson et al.

(10) Patent No.: US 7,393,602 B2
(45) Date of Patent: Jul. 1, 2008

(54) METHOD TO BEGIN COOLANT CIRCULATION TO PREVENT MEA OVERHEATING DURING COLD START

(75) Inventors: Eric L. Thompson, Honeoye Falls, NY (US); Yan Zhang, Victor, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 464 days.

(21) Appl. No.: 11/105,790

(22) Filed: Apr. 14, 2005

(65) Prior Publication Data
US 2006/0234092 A1    Oct. 19, 2006

(51) Int. Cl.
H01M 8/00    (2006.01)
H01M 8/04    (2006.01)

(52) U.S. Cl. .............. 429/13; 429/23; 429/24

(58) Field of Classification Search ............ 429/24, 429/13, 23, 34
See application file for complete search history.

(56) References Cited

U.S. PATENT DOCUMENTS 6,479,177 B1    11/2002    Roberts et al.
6,777,115 B2    8/2004    Reiser
2004/0033396 A1    2/2004    Thompson et al.

FOREIGN PATENT DOCUMENTS

WO    2004/086546 A2    10/2004

*Primary Examiner*—Patrick Joseph Ryan
*Assistant Examiner*—Thomas H. Parsons

(57) ABSTRACT

A system and method for determining the internal temperature of a fuel cell stack during stack start-up so as to start a cooling fluid flow before the internal temperature of the stack rises above a temperature that might damage the fuel cells within the stack. The system and method include determining an initial temperature from either an ambient temperature sensor or a sensor in the cooling fluid manifold in the stack, measuring the voltage of the stack and the current from the stack, and from these values determining the waste heat from the stack to determine its temperature. If hydrogen is sent to the cathode side of the stack during the start-up, then the system and method also include determining the flow rate of the hydrogen.

38 Claims, 10 Drawing Sheets

METHOD TO BEGIN COOLANT CIRCULATION TO PREVENT MEA OVERHEATING DURING COLD START

BACKGROUND OF THE INVENTION

1. Field of the Invention

This invention relates generally to a method for controlling coolant circulation to a fuel cell stack at cold start-up and, more particularly, to a fuel cell system including a fuel cell stack, where the system employs a control scheme for circulating a cooling fluid through the fuel cell stack at the proper time during a cold start-up so as to prevent the fuel cells from being damaged by excessive temperatures.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid-polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management, humidification and temperature control, and control of catalyst poisoning constituents, such as carbon monoxide (CO).

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of flow field plates or bipolar plates positioned between the MEAs in the stack. The bipolar plates include an anode side and a cathode side for adjacent fuel cells in the stack. Anode gas flow channels are provided on the anode side of the bipolar plates that allow the anode gas to flow to the anode side of each MEA. Cathode gas flow channels are provided on the cathode side of the bipolar plates that allow the cathode gas to flow to the cathode side of each MEA. The bipolar plates are made of a conductive material, such as stainless steel, so that they conduct the electricity generated by the fuel cells from one cell to the next cell as well as out of the stack.

It is necessary that a fuel cell operate at an optimum relative humidity and temperature to provide efficient stack operation and durability. A typical stack operating temperature for an automotive fuel cell stack is between 60°-80° C. Excessive stack temperatures above the optimum temperature may damage fuel cell components, reducing the lifetime of the fuel cells. Also, stack temperatures below the optimum temperature reduces the stack performance. Therefore, fuel cell systems employ thermal sub-systems that direct a cooling fluid through flow channels within the fuel cell stack to control its temperature.

At vehicle start-up, the fuel cell stack is typically well below its optimum operating temperature, especially in low temperature environments. It is desirable to raise the temperature of the fuel cell stack to its operating temperature as quickly as possible to increase the stack performance, which could take a minute or longer. In order to allow the fuel cell stack to reach its operating temperature quickly, the cooling fluid is not flowed through the stack for a certain period of time after start-up to allow the stack to rapidly heat up as a result of the waste heat generated by the electro-chemical process. Also, various operations are known in the art to increase the temperature of the fuel cell stack more quickly at stack start-up, such as bleeding hydrogen into the cathode side of the fuel cells to provide combustion that can be used to heat the stack. Further, if a cold coolant flow is allowed to circulate before the stack is warm enough, the performance of the stack may suffer and cells may fail as a result of the cold coolant.

It is important to prevent the MEAs from overheating and sustaining degradation during the start-up process. It is known in the art to measure the temperature of the cathode exhaust from the cathode side of the fuel cell stack during fuel cell start-up to determine the fuel stack temperature in order to start the cooling fluid flow at the proper time. Typically, when the cathode output temperature reaches 25°-40° C., the coolant pump is started to circulate the coolant flow through the stack. However, it has been discovered that when the cathode exhaust temperature is in this temperature range, the temperature of some portions of the MEAs within the fuel cells can exceed 100° C. It is believed that continued and repetitive exposure of the MEAs to these high temperatures can result in material degradation and durability failures, such as pinholes in the MEA.

SUMMARY OF THE INVENTION

In accordance with the teachings of the present invention, a system and method are disclosed for determining the internal temperature of a fuel cell stack during a cold stack start-up so as to start a cooling fluid flow before the internal temperature of the stack rises above a temperature that might damage the fuel cells within the stack. The system and method include determining an initial stack temperature from either an ambient temperature sensor or a sensor in the stack cooling fluid manifold, measuring the voltage of the stack and measuring the current from the stack, and from these values and the specific heat capacity of the stack materials, determining the waste heat from the stack to determine its temperature. If hydrogen is sent to the cathode side of the stack during the start-up, then the system and method also include determining the flow rate of the hydrogen.

In one embodiment, the method includes determining the start temperature of the fuel cell stack; calculating a theoretical voltage of the fuel cell stack using a low heating value or a high heating value; calculating an average cell voltage of the fuel cells in the fuel cell stack; calculating an average current density of the fuel cells in the fuel cell stack; scaling the calculated current density to account for localized non-uniformities; calculating a heat rate of the fuel cell stack; scaling the calculated heat rate based on the temperature to include heat losses from a control volume element; determining whether to use the scaled heat rate or the un-scaled heat rate for a temperature calculation based on the current density; calculating a generated energy in the control element based on the scaled or unscaled heat rate over a predetermined time interval; calculating a temperature increase in the control element based on the energy in the element and the specific heat of the element; calculating a new temperature of the control element based on the increased temperature of the element; and starting the coolant pump if the new temperature is above a predetermined temperature. If hydrogen is sent to the cathode side of the stack during the start-up, the method further includes calculating a heat input from the flow rate of the hydrogen to the cathode side, and using the heat rate and the heat input to calculate the energy in the control element over the time interval.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a system and method for starting a cooling fluid flow to a fuel cell stack at fuel cell system start-up is merely exemplary in nature, and is in no way intended to limit the invention or its applications or uses.

Figure 1:
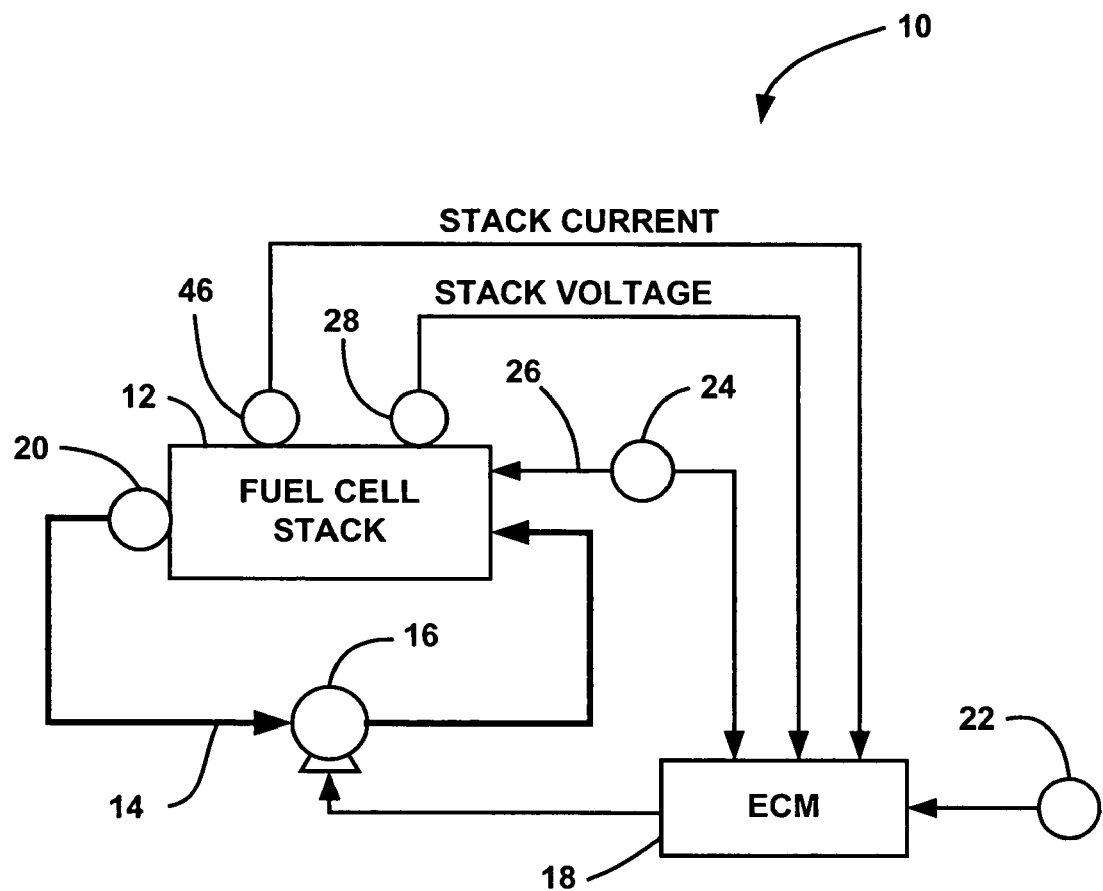
FIG. 1 is a block diagram of a fuel cell system that employs a technique for determining when to pump a cooling fluid through a fuel cell stack at a cold system start-up, according to an embodiment of the present invention.
Figure 2A:
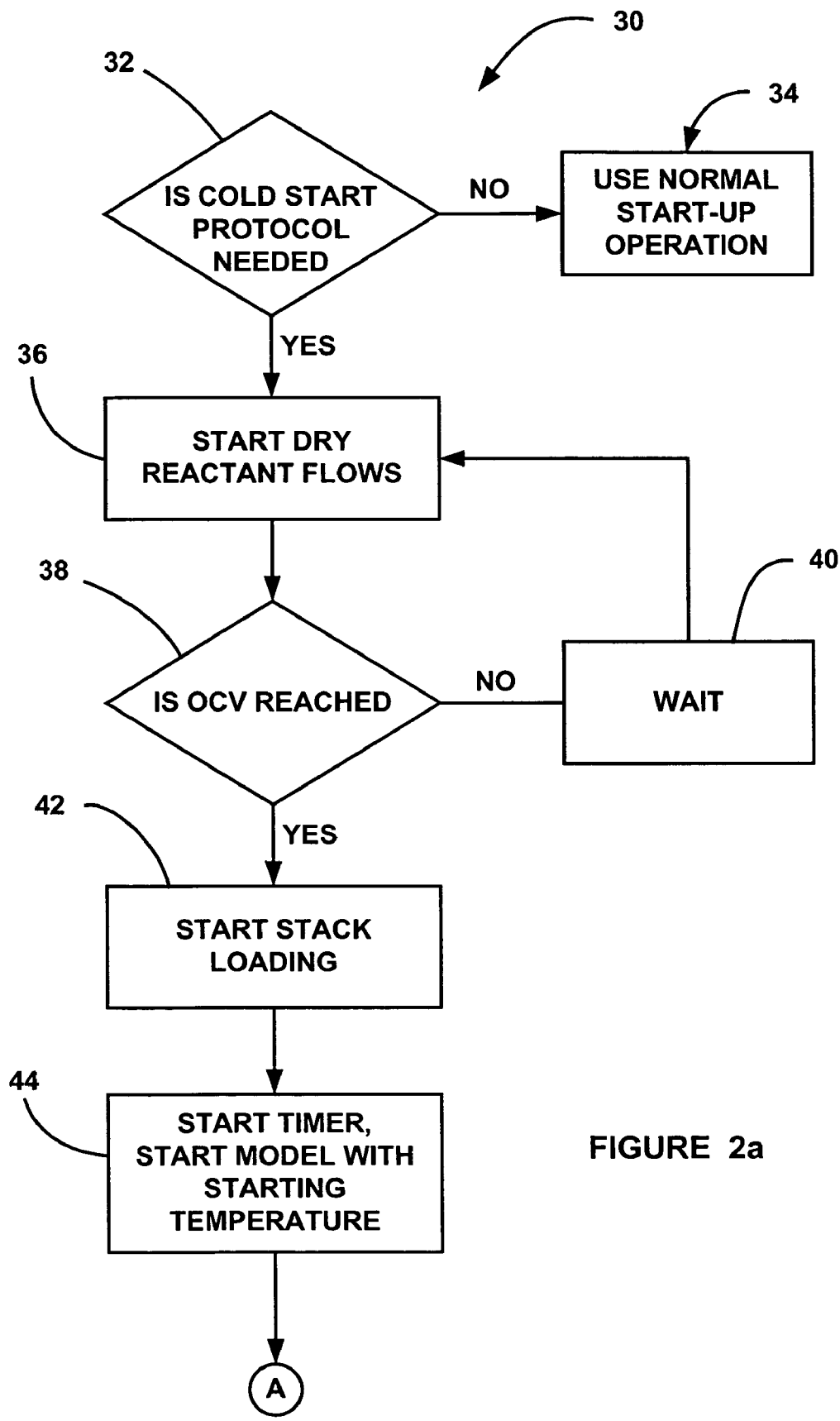
FIGS. 2a-2i are flow chart diagrams showing the operation of the technique referred to in FIG. 1.
Figure 2B:
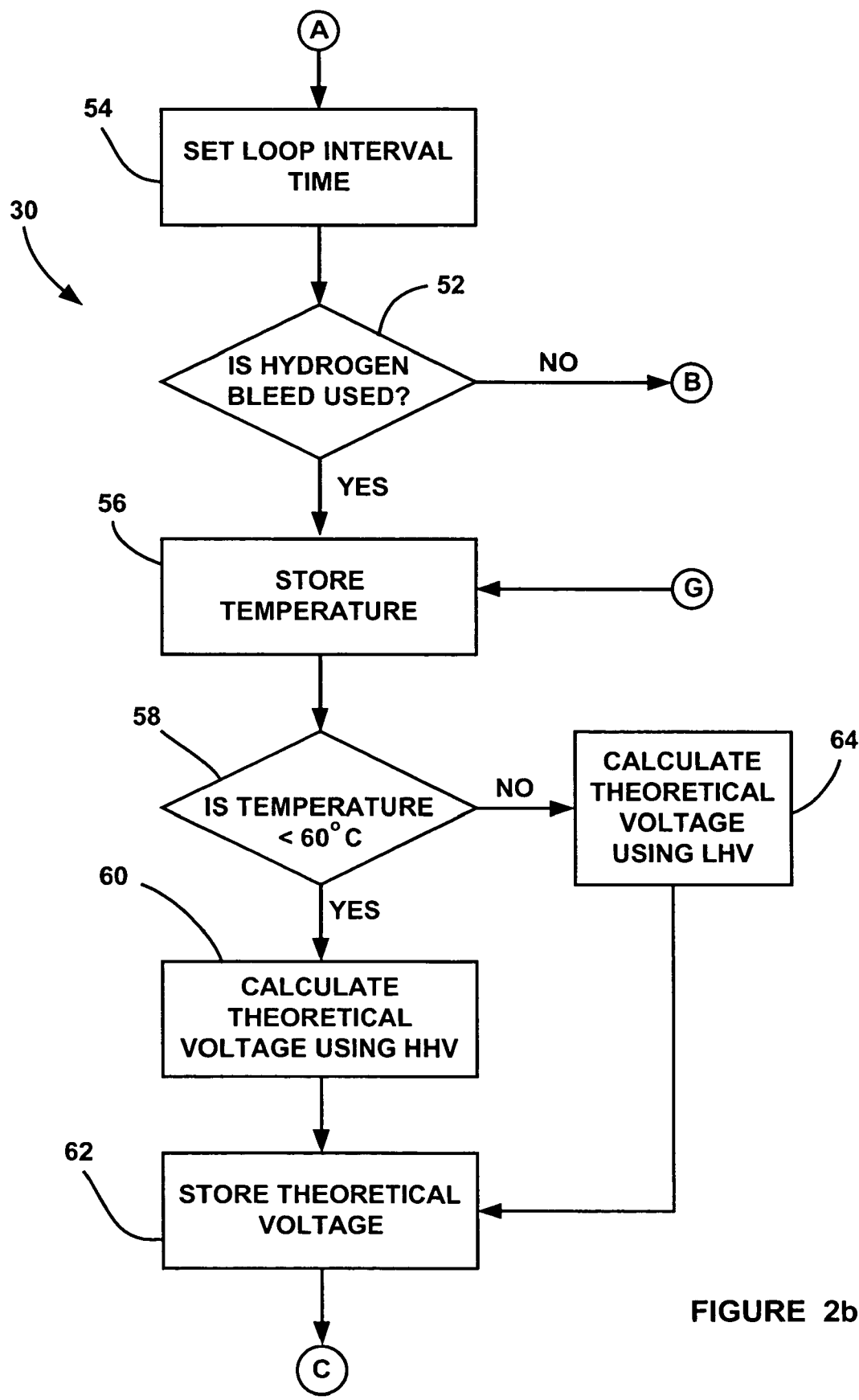
Figure 2C:
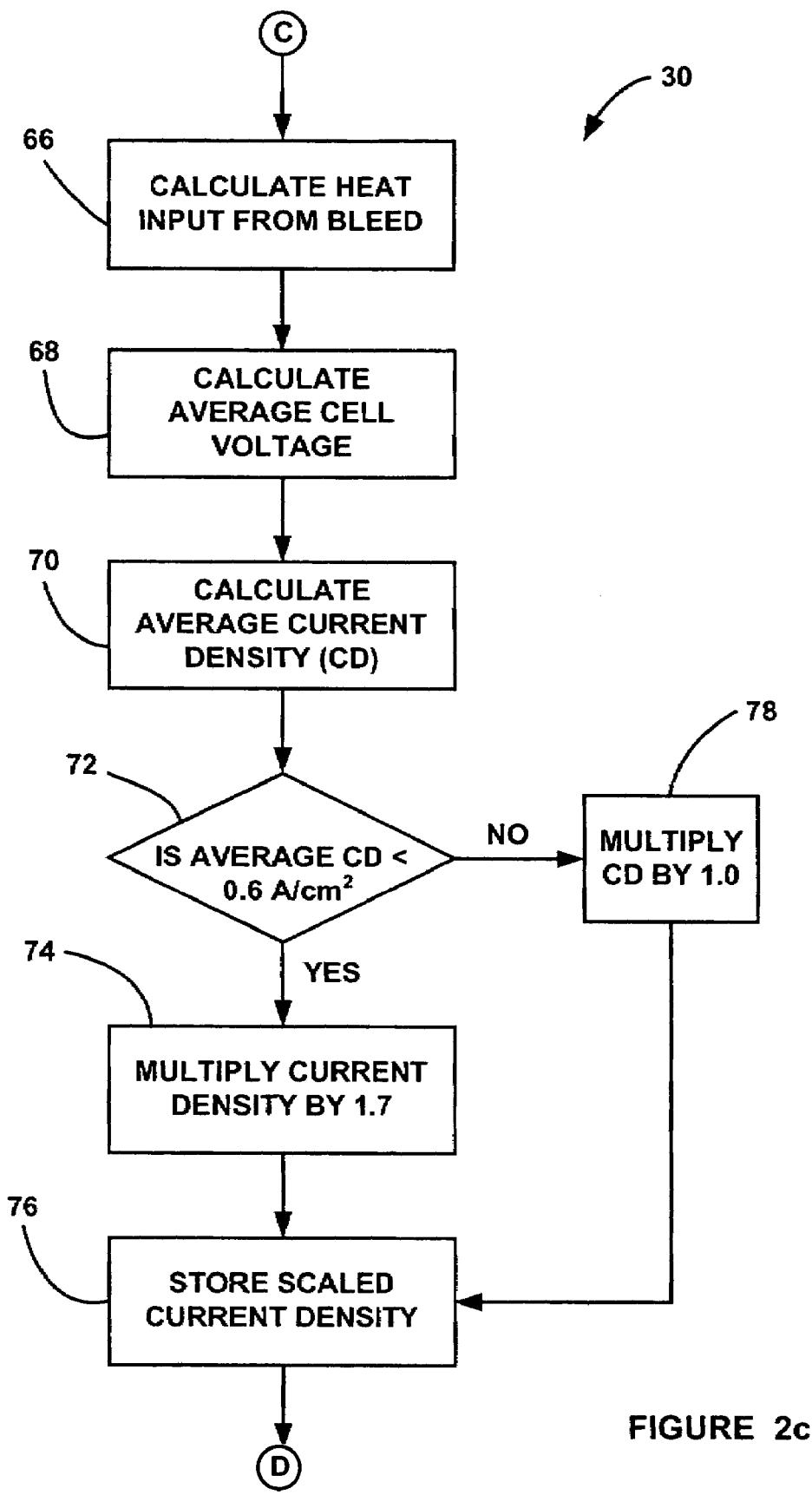
Figure 2D:
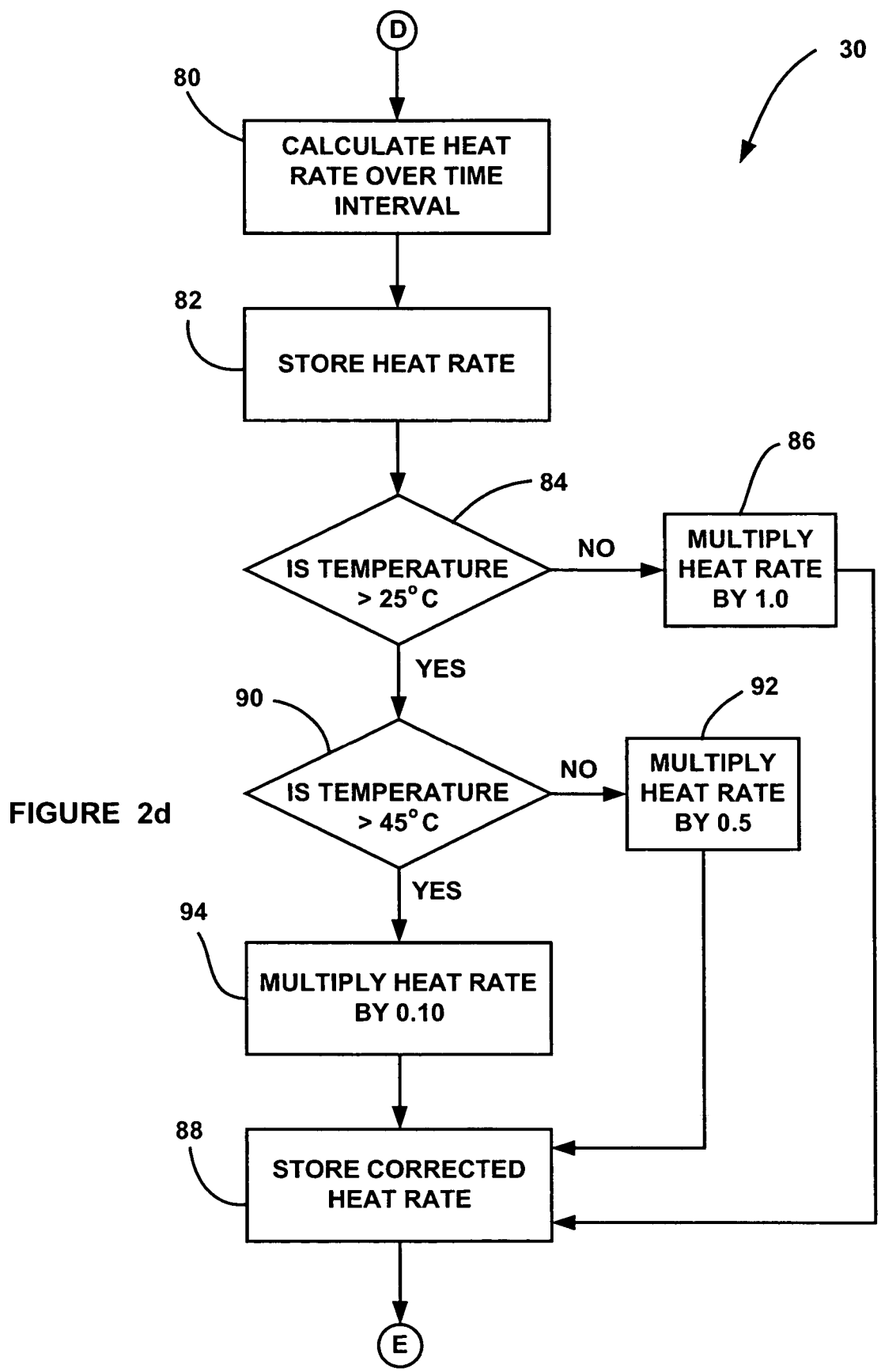
Figure 2E:
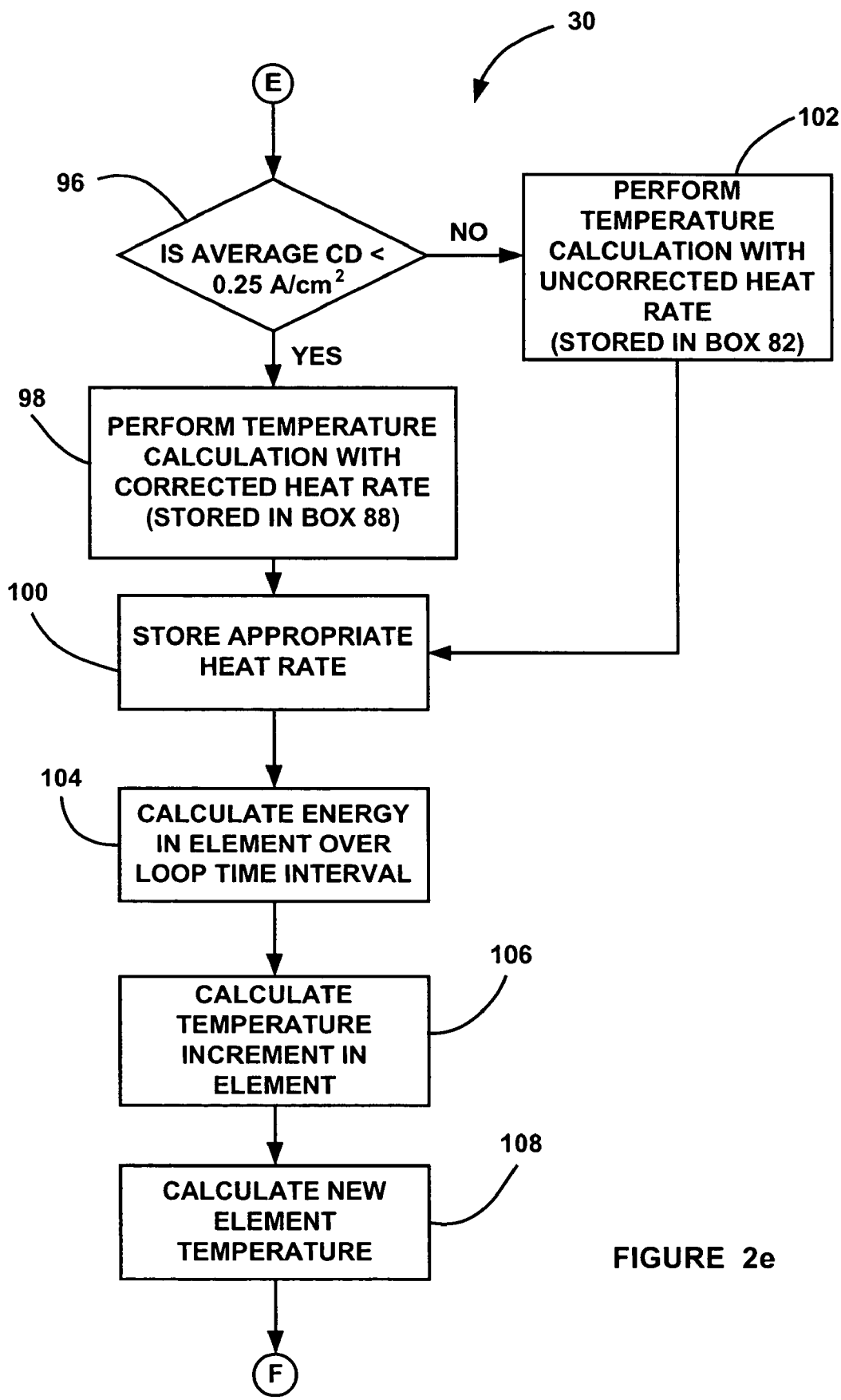
Figure 2F:
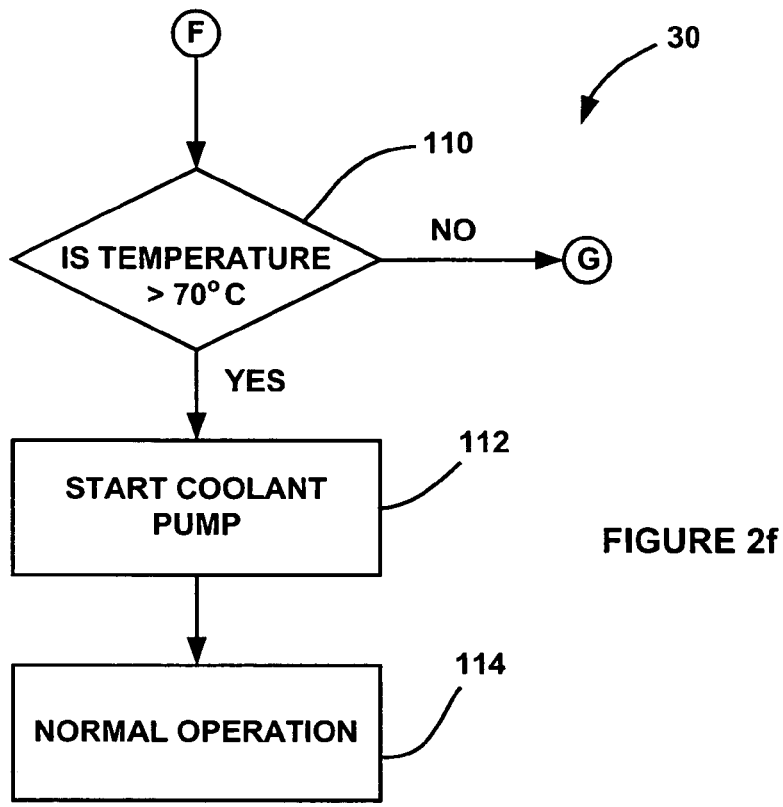
Figure 2F:
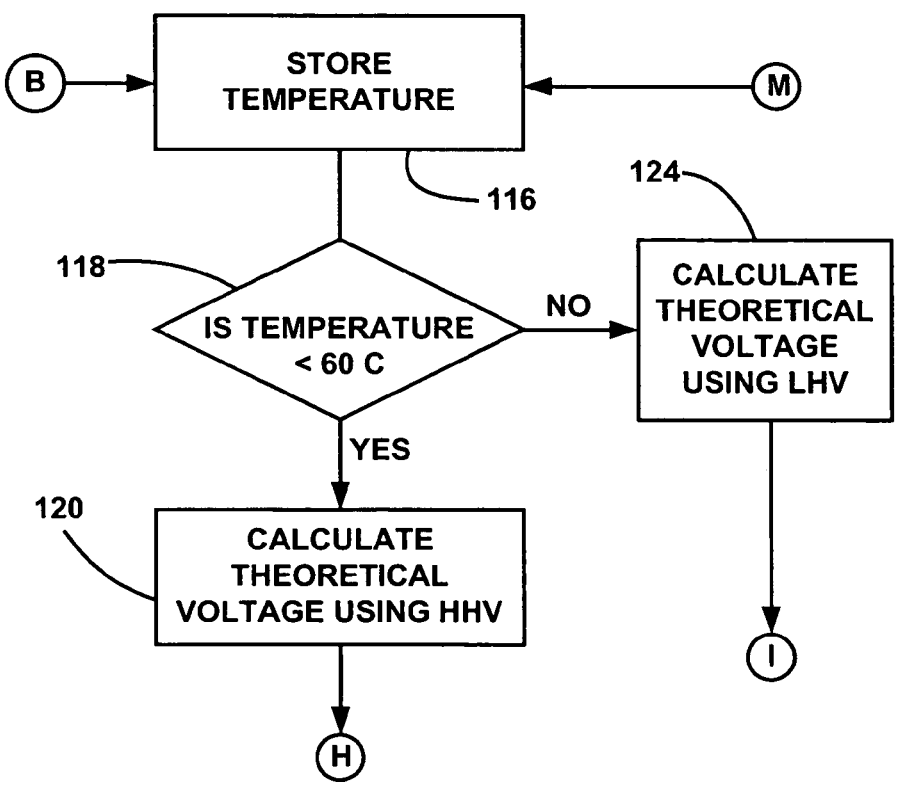
Figure 2G:
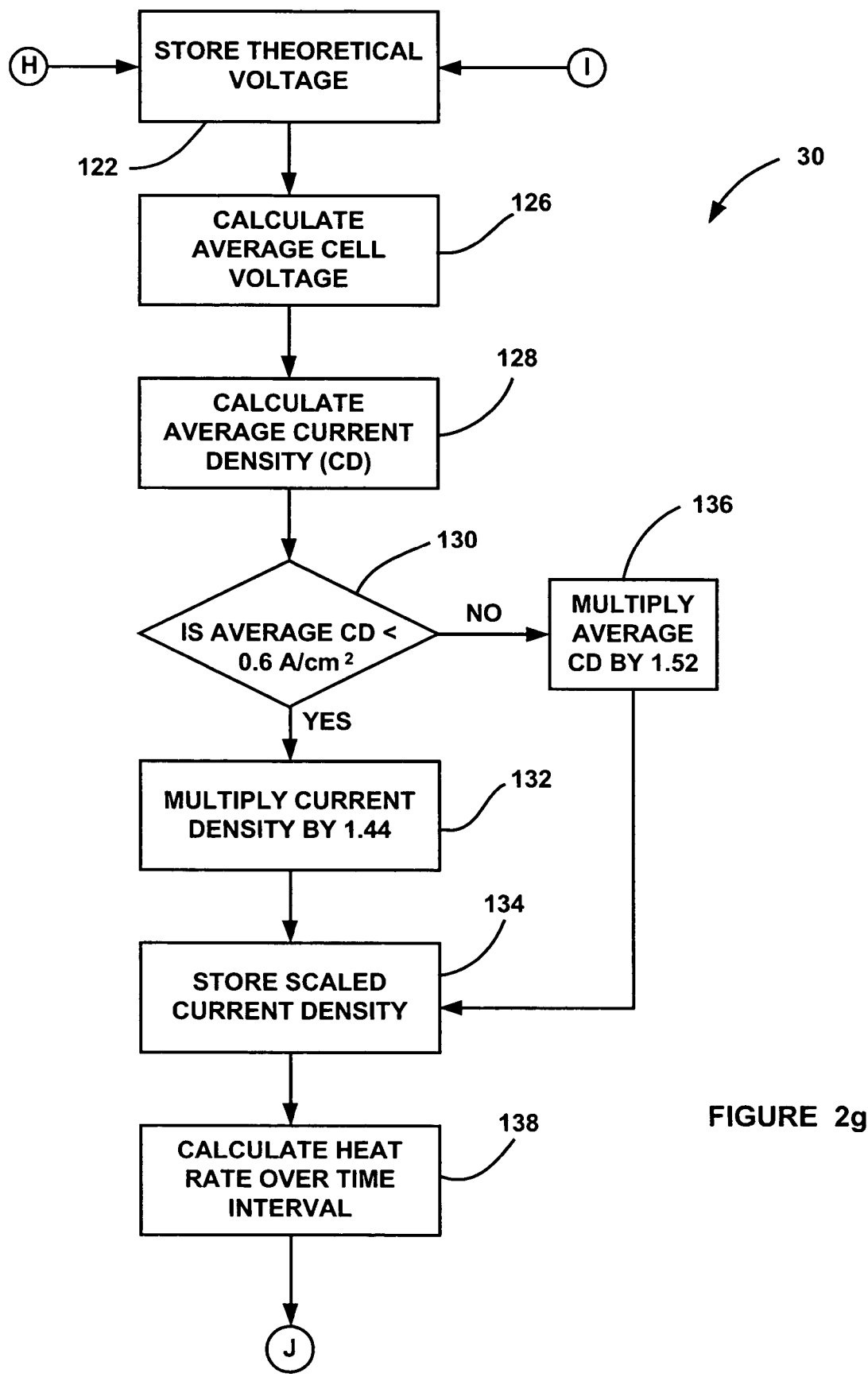
Figure 2H:
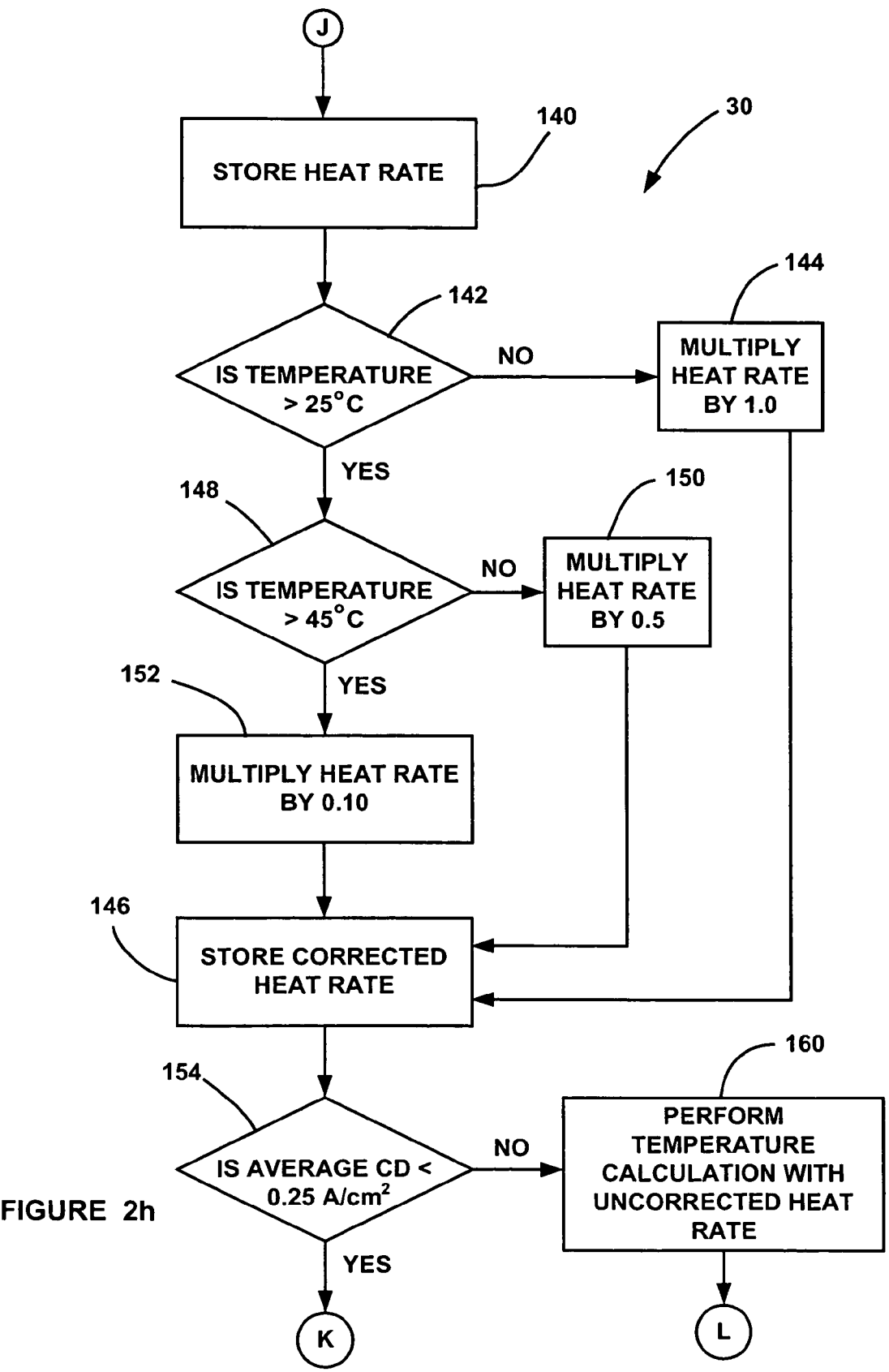
Figure 2I:
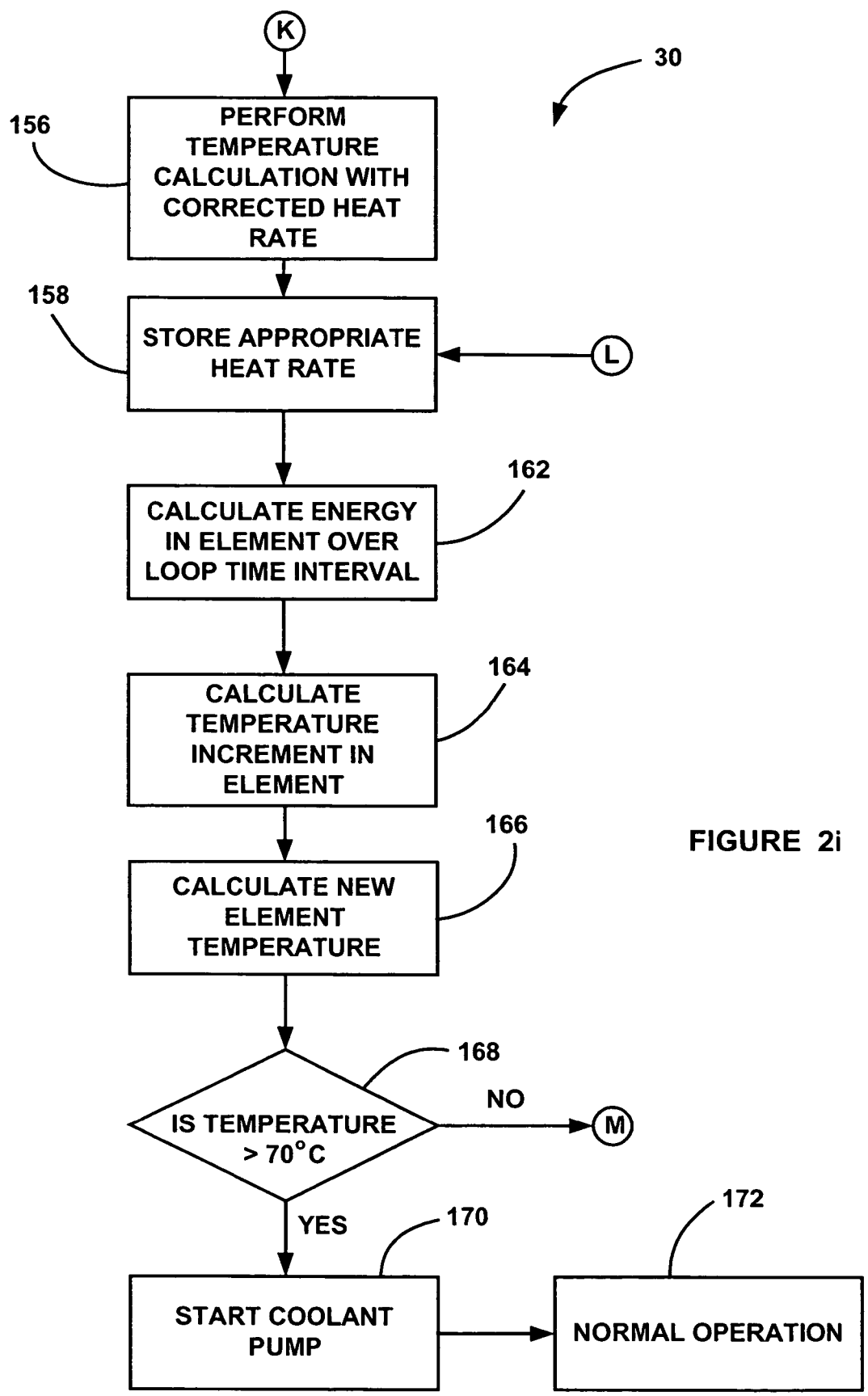

FIG. 1 is a block diagram of a fuel cell system 10 including a fuel cell stack 12. A cooling fluid, such as water, is pumped through coolant flow channels in the fuel cell stack 12 and an external line 14 by a pump 16. According to the invention, an electronic control module ( ECM) 18 controls the start of the pump 16 at a cold vehicle start-up based on a calculated internal temperature of the fuel cell stack 12, as will be discussed in detail below. The ECM 18 predicts the warmest temperature in the stack 12 during a cold start when no cooling fluid is flowing through the stack 12 by defining a hypothetical control volume element, and calculating the temperature of the control volume. In one embodiment, the control volume element is a portion of a representative plate, diffusion media layer and MEA in one of the fuel cells in the stack 12 used for modeling purposes.

The ECM 18 receives a temperature signal from a temperature sensor 20 positioned within a cooling fluid manifold within the stack 12 and/or an ambient temperature sensor 22. The ECM 18 also receives a stack voltage signal from a voltage sensor 28 in the stack 12 and a stack current signal from a current sensor 46 in the stack 12. In one embodiment, hydrogen may be bled into the cathode side of the stack 12 at start-up to provide combustion for more rapidly increasing the temperature of the stack 12. The ECM 18 also receives the hydrogen bleed flow rate signal from a flow meter 24 or a pulse injector positioned within a cathode input line 26 to the stack 12.

FIGS. 2a-2i are flow chart diagrams 30 showing the operation of calculating the internal temperature of the fuel cell stack 12 at cold start-up, according to the invention. It is noted that the various values used by the ECM 18 referred to below are values determined for a particular application based on experimentations and simulations for an optimum performance. As will be appreciated by those skilled in the art, other values may be used for other applications.

The ECM 18 first determines if a cold start protocol is needed at decision diamond 32 based on the temperature signal from the temperature sensor 20 or 22. In one embodiment, the cold start protocol is not needed if the ambient temperature or the temperature of the cooling fluid in the manifold is greater than 5° C. If the cold start protocol is not needed at the decision diamond 32, then the ECM 18 goes through a normal start-up operation at box 34 by immediately pumping the cooling fluid through the fuel cell stack 12. If the cold start protocol of the invention is required at the decision diamond 32, then the ECM 18 starts the anode and cathode reactant flows to the stack 12 at box 36. The ECM 18 then determines whether an open circuit voltage (OCV) from the stack 12 is reached at decision diamond 38 so that the stack 12 is not loaded until all of the cells are producing sufficient voltage. In one embodiment, this open circuit voltage is about 700 mV. If the OCV has not been reached at the decision diamond 38, then the ECM 18 waits for some predetermined period of time at box 40 until the desired OCV has been reached at the decision diamond 38. Once the OCV has been reached at the decision diamond 38, the ECM 18 allows a load to be applied to the fuel cell stack 12 at box 42. The ECM 18 then starts a timer and the control model for calculating the stack temperature with the starting temperature at box 44.

The ECM 18 sets a loop time interval at box 54. In this embodiment, the loop time interval is set at one second. The ECM 18 then determines whether a hydrogen bleed is being used at decision diamond 52. If the hydrogen bleed is being used, the ECM 18 stores the start temperature at box 56, which is either provided by the temperature sensor 20 or the ambient temperature sensor 22 for the first time, or the calculated temperature from the calculation below.

The ECM 18 then determines a theoretical voltage of the fuel cell stack 12 as the average voltage of each cell using either a low heating value (LHV) or a high heating value (HHV). The HHV is used when the stack temperature is below a predetermined temperature because the product from the electro-chemical reaction will be liquid water. The ECM 18 uses the LHV if the stored temperature is above the predetermined temperature because the product from the electro-chemical reaction will be water vapor. Particularly, the ECM 18 determines whether the stored temperature is above or below 60° C. at decision diamond 58. If the stored temperature is below 60° C., then the ECM 18 calculates the theoretical voltage using the HHV at box 60, and stores the theoretical voltage at box 62. In one embodiment, the theoretical voltage using the HHV is calculated as 1.47995+(0.00005×the stored temperature value). However, if the stored temperature is greater than or equal to 60° C., then the ECM 18 calculates the theoretical voltage using the LHV at box 64, and stores the theoretical voltage at the box 62. In one embodiment, the theoretical voltage using the LHV is calculated as 1.25193+(0.00005×the stored temperature value).

The ECM 18 then calculates a heat input value from the hydrogen bleed at box 66 based on the measured flow rate of the hydrogen from the flow rate sensor 24 provided to the cathode side of the fuel cell stack 12. In one embodiment, the ECM 18 uses the following equation to calculate the heat input in watts (W), where the flow rate is in standard cubic centimeters per minute (SCCM).

$$\left[\frac{\text{Flow rate }(SCCM)*0.00149}{1000}\right]*120{,}000\,\text{KJ/g} = [W]$$

The ECM 18 then calculates the average cell voltage at box 68 as the measured stack voltage from the voltage sensor 28 divided by the number of cells in the stack 12. The ECM 18 then calculates the average current density (CD) of the fuel cell stack 12 at box 70 as the measured stack current from the current sensor 46 divided by the active area of each cell.

The ECM 18 then uses a correction factor to scale the current density to account for localized non-uniformities in the fuel cells. It has been determined by experimentation that it is not necessary to scale or correct the current density if it is greater than 0.6 A/cm² because the current density will be relatively uniform across the entire cell. The ECM 18 determines if the average current density is less than 0.6 A/cm² at decision diamond 72. If the average current density is less than 0.6 A/cm², then the ECM 18 multiplies the current density by the scaling factor 1.7 at box 74, and stores the scaled current density at box 76. If the average current density is equal to or greater than 0.6 A/cm² at the decision diamond 72, then the ECM 18 multiplies the current density by 1 (no correction) at box 78, and stores the un-scaled current density at the box 76.

The ECM 18 then calculates a heat rate value of the fuel cell stack 12 over the predetermined time interval at box 80. In one embodiment, the heat rate value is calculated in watts as:

(theoretical voltage−average voltage of the fuel cell stack 12)*the scale current density of the fuel cell stack 12\*the active area of each of the cells in the fuel cell stack 12

The ECM 18 then stores the calculated heat rate value at box 82.

The ECM 18 then scales the heat rate value to include heat losses from the control volume element. At higher temperatures, only about 10% of the heat produced by the control element stays in the control element and 90% of the heat is lost from the control element to other regions of the fuel cell or to its environment. Particularly, the ECM 18 determines if the stored temperature is greater than 25° C. at decision diamond 84. If the temperature is not greater than 25° C. at the decision diamond 84, then the ECM 18 multiplies the heat rate value by one (no scaling) at box 86 and stores the un-scaled heat rate value at box 88. If the temperature is greater than 25° C. at the decision diamond 84, then the ECM 18 determines whether the temperature is greater than 45° C. at decision diamond 90. If the temperature is not greater than 45° C. at the decision diamond 90, then the ECM 18 multiplies the heat rate value by 0.5 at box 92 and stores the scaled heat rate value at the box 88. If the temperature is greater than 45° C. at the decision diamond 90, then the ECM 18 multiplies the heat rate value by 0.10 (10%) at box 94 and stores the scaled heat rate value at the box 88.

It has been determined that there is a heat loss from the stack 12 only at lower current densities. At higher current densities, there is not enough time to transport the heat out of the control volume element and out of the stack 12, and therefore the heat loss is not significant. Thus, if the average current density is greater than a predetermined value, the heat rate value is not corrected. If, however, the average current density is less than the predetermined value and the temperature is greater than 25° C., then the heat rate value is corrected to compensate for the heat loss. Particularly, the ECM 18 determines whether the average current density is less than 0.25 A/cm² at decision diamond 96. If the average current density is less than 0.25 A/cm² at the decision diamond 96, then the ECM 18 will perform the temperature calculation at box 98, discussed below, with the scaled heat rate value stored in the box 88, and then store the corrected heat rate value at box 100. If the average current density is equal to or greater than 0.25 A/cm² at the decision diamond 96, then the ECM 18 performs the temperature calculation at box 102 with the un-scaled heat rate value stored in the box 82, and then stores the un-scaled heat rate value at the box 100.

The ECM 18 then calculates the energy in the control volume element over the loop time interval at box 104. In one embodiment, this calculation is given in Joules (J) by:

[heat rate+heat input]*time interval=[J]

The ECM 18 then calculates the temperature increase so far in the control volume element at box 106. In one embodiment, the temperature increase in the control element is determined by the energy in the control element divided the product of the mass of the control element times the specific heat capacity of the control element over the loop time interval (E/MCp).

The ECM then calculates the new temperature of the control element at box 108 by adding the calculated temperature increase at the box 106 plus the stored temperature at the box 56. The stored temperature at the box 56 will be the start temperature from the temperature sensor 20 or 22, or will be the previously calculated new temperature as the ECM 18 loops through the flow chart diagram 30. The new temperature is the calculated temperature of the control element and is representative of the hottest fuel cell in the stack 12. The new temperature is used for determining whether the coolant pump 16 should be started.

The ECM 18 then determines whether the new temperature is greater than 70° C. at decision diamond 110. If the temperature is less than or equal to 70° C., then the ECM 18 returns to the box 54 to recalculate the new temperature of the control volume element by the above-described steps. If, however, the temperature of the control element is greater than 70° C., then the ECM 18 starts the coolant pump 16 at box 112 and proceeds with normal fuel cell system operation after start-up at box 114. In one embodiment, the pump 16 can be pulsed to limit the amount of cold cooling fluid entering the stack 12.

If the ECM 18 determines that a hydrogen bleed is not being used at the decision diamond 52, then the ECM 18 goes through the process of calculating the temperature of the control volume element based on different values in nearly the same manner as was done for a hydrogen bleed. Particularly, the temperature is stored at box 116 and the theoretical voltage is calculated and stored at decision diamond 118 and boxes 120, 122 and 124. The same HHV and LHV are used for determining the theoretical voltage as was done with the hydrogen bleed. Because there is not a hydrogen bleed in this process, the ECM 18 does not calculate the heat input at the box 66. The average cell voltage and average current density are calculated at boxes 126 and 128, respectively. The current density is then scaled at decision diamond 130 and boxes 132, 134 and 136. For the current density scaling with no hydrogen bleed, the multiplied values are 1.52 and 1.44.

The heat rate value is then calculated and stored at boxes 138 and 140, respectively. The heat rate value is scaled and stored at decision diamonds 142 and 148 and boxes 144, 146, 150 and 152 using the same correction values as with the hydrogen bleed. The ECM then determines whether the original heat rate value or the scaled heat rate value will be used for the temperature calculation at decision diamond 154 and boxes 156, 158 and 160. The ECM 18 then calculates the energy in the control element over the loop time interval at box 162, the temperature increment in the control element at box 164 and the new temperature at box 166. The ECM 18 then determines if the new temperature in the control element is greater than 7020 C. at decision diamond 168, and returns to determine the new temperature at the box 116 if it is not. If the temperature is greater than 70° C., then the ECM 18 starts the pump 16 at box 170 and returns to normal fuel cell system operation at box 172.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining when to start a coolant pump in a fuel cell system at system start-up, said fuel cell system including a fuel cell stack, said fuel cell stack including a stack of fuel cells, said method comprising:
    determining a start temperature of the fuel cell stack;
    calculating a theoretical voltage of the fuel cell stack;
    calculating an average cell voltage for the fuel cells in the fuel cell stack;
    calculating an average current density of the fuel cells in the fuel cell stack;
    scaling the calculated current density to account for localized non-uniformities in the fuel cells;
    calculating an original heat rate of the fuel cell stack over a predetermined time interval;
    scaling the original heat rate based on the start temperature to provide a corrected heat rate to include heat losses from a control volume element;
    determining whether to use the corrected heat rate or the original heat rate based on the current density for a temperature calculation;
    calculating an energy in the control element based on the determined heat rate over the time interval;
    calculating a temperature increase of the control element based on the energy in the control element;
    calculating a new temperature of the control element based on the temperature increase of the control element;
    starting the coolant pump if the new temperature is above a predetermined temperature; and
    using the new temperature as the start temperature to repeat the process of calculating the new temperature if the new temperature is less than the predetermined temperature.

2. The method according to claim 1 further comprising determining if a hydrogen bleed is being provided to a cathode side of the fuel cell stack, and calculating a heat input based on a flow rate of the hydrogen to the cathode side.

3. The method according to claim 2 wherein calculating an energy in the control element based on the determined heat rate includes summing the determined heat rate plus the heat input, and then multiplying the summed result times the predetermined time interval.

4. The method according to claim 1 wherein determining a start temperature of the fuel cell stack includes using a sensed temperature from a temperature sensor in a cooling fluid manifold in the stack or a sensed temperature from an ambient temperature sensor.

5. The method according to claim 1 wherein calculating a theoretical voltage of the fuel cell stack includes calculating a theoretical voltage of the fuel cell stack using a low heat value if the stored temperature is above a predetermined temperature where a product of the fuel cell stack is water vapor, and using a high heat value if the start temperature is below the predetermined temperature where the product of the fuel cell stack is liquid water.

6. The method according to claim 1 wherein scaling the calculated current density includes scaling the current density if the current density is less than a predetermined value and not scaling the calculated current density if the current density is above the predetermined value.

7. The method according to claim 1 wherein calculating an original heat rate of the fuel cell stack over a predetermined time interval includes subtracting the average voltage from the theoretical voltage and then multiplying the current density and an active area of the fuel cells by the subtracted value.

8. The method according to claim 1 wherein scaling the original heat rate to provide a corrected heat rate to include heat losses from a control volume element includes multiplying the original heat rate by a first predetermined value if the start temperature is greater than a first predetermined temperature, but less than a second predetermined temperature, multiplying the original heat rate by a second predetermined value if the start temperature is greater than the second predetermined temperature and multiplying the original heat rate by one if the start temperature is less than the first predetermined temperature.

9. The method according to claim 1 wherein determining whether to use the corrected heat rate or the original heat rate for the temperature calculation includes using the corrected heat rate if the average current density is below a predetermined current density and using the original heat rate if the average current density if greater than the predetermined current density.

10. The method according to claim 1 wherein calculating a temperature increase of the control element based on the energy in the control element includes dividing the energy in the control element by the product of the mass of the control element times the specific heat of the control element.

11. The method according to claim 1 further comprising determining if a predetermined open circuit voltage of the fuel cell stack has been reached before calculating a theoretical voltage of the fuel cell stack.

12. The method according to claim 1 wherein the control volume element is a portion of an MEA, a diffusion media and a bipolar plate in the stack.

13. A control system for determining when to start a coolant pump in a fuel cell system at fuel cell system start-up, said fuel cell system including a fuel cell stack, said fuel cell stack including a stack of fuel cells, said control system comprising:
    means for determining a start temperature of the fuel cell stack;
    means for calculating a theoretical voltage of the fuel cell stack;
    means for calculating an average cell voltage for the fuel cells in the fuel cell stack;
    means for calculating an average current density of the fuel cells in the fuel cell stack;
    means for scaling the calculated current density to account for localized non-uniformities in the fuel cells;

means for calculating an original heat rate of the fuel cell stack over a predetermined time interval;

means for scaling the original heat rate based on the start temperature to provide a corrected heat rate to include heat losses from a control volume element;

means for determining whether to use the corrected heat rate or the original heat rate based on the current density for a temperature calculation;

means for calculating an energy in the control element based on the determined heat rate over the time interval;

means for calculating a temperature increase of the control element based on the energy in the control element;

means for calculating a new temperature of the control element based on the temperature increase of the control element; and means for starting the coolant pump if the new temperature is above a predetermined temperature, wherein the new temperature is used as the start temperature to repeat the process of calculating the new temperature if the new temperature is less than the predetermined temperature.

14. The control system according to claim 13 further comprising means for determining if a hydrogen bleed is being provided to a cathode side of the fuel cell stack, and means for calculating a heat input based on a flow rate of the hydrogen to the cathode side.

15. The control system according to claim 14 wherein the means for calculating an energy in the control element based on the determined heat rate includes means for summing the determined heat rate plus the heat input, and then multiplying the summed result times the predetermined time interval.

16. The control system according to claim 13 wherein the means for determining a start temperature of the fuel cell stack includes means for using a sensed temperature from a temperature sensor in a cooling fluid manifold or a sensed temperature from an ambient temperature sensor.

17. The control system according to claim 13 wherein the means for calculating a theoretical voltage of the fuel cell stack includes means for calculating a theoretical voltage of the fuel cell stack using a low heat value if the stored temperature is above a predetermined temperature where a product of the fuel cell stack is water vapor, and using a high heat value if the start temperature is below the predetermined temperature where the product of the fuel cell stack is liquid water.

18. The control system according to claim 13 wherein the means for scaling the calculated current density includes means for scaling the current density if the current density is less than a predetermined value and not scaling the calculated current density if the current density is above the predetermined value.

19. The control system according to claim 13 wherein the means for calculating an original heat rate of the fuel cell stack over a predetermined time interval includes means for subtracting the average voltage from the theoretical voltage and then multiplying the current density and an active area of the fuel cells by the subtracted value.

20. The control system according to claim 13 wherein the means for scaling the original heat rate to provide a corrected heat rate to include heat losses from a control volume element includes means for multiplying the original heat rate by a first predetermined value if the start temperature is greater than a first predetermined temperature, but less than a second predetermined temperature, multiplying the original heat rate by a second predetermined value if the start temperature is greater than the second predetermined temperature and multiplying the original heat rate by one if the start temperature is less than the first predetermined temperature.

21. The control system according to claim 13 wherein the means for determining whether to use the corrected heat rate or the original heat rate includes means for using the corrected heat rate if the average current density is below a predetermined current density and using the original heat rate if the average current density is greater than the predetermined current density.

22. The control system according to claim 13 wherein the means for calculating a temperature increase of the control element based on the energy in the control element includes means for dividing the energy in the control element by the product of the mass of the control element times the specific heat of the control element.

23. The control system according to claim 13 further comprising means for determining if an open circuit voltage of the fuel cell stack has been reached before calculating a theoretical voltage of the fuel cell stack.

24. The control system according to claim 13 wherein the control volume element is a portion of an MEA, a diffusion media and a bipolar plate in the stack.

25. A fuel cell stack including a stack of fuel cells, said fuel cell stack comprising:

a temperature sensor for sensing a start temperature of the fuel cell stack and providing a temperature signal;

a voltage sensor for measuring the voltage of the stack and providing a stack voltage signal;

a current sensor for measuring the current of the stack and providing a stack current signal;

a pump for pumping a cooling fluid through the fuel cell stack; and an electronic control module for determining when to start the pump for pumping the cooling fluid through the fuel cell stack at a cold stack start-up, said electronic control module using the temperature signal, the voltage signal and the current signal to determine a temperature of a control volume element within the stack.

26. The fuel cell system according to claim 25 further comprising a flow sensor for measuring a hydrogen flow to a cathode side of the fuel cell stack during start-up and providing a hydrogen bleed signal, said electronic control module also using the hydrogen bleed signal for determining the temperature of the control volume element.

27. The fuel cell system according to claim 25 wherein the temperature sensor is selected from the group consisting of cooling fluid manifold temperature sensors and ambient temperature sensors.

28. The fuel cell system according to claim 25 wherein the electronic control module calculates a theoretical voltage of the fuel cell stack based on whether the stack is generating product water liquid or product vapor, calculates an average cell voltage of the fuel cells in the fuel cell stack, calculates an average current density of the fuel cells in the fuel cell stack, and scales the calculated current density to account for localized non-uniformities in the fuel cells to determine the temperature of the control element.

29. The fuel cell system according to claim 28 wherein the electronic control module calculates an original heat rate of the fuel cell stack over a predetermined time interval, scales the original heat rate based on the temperature signal to provide a corrected heat rate to include heat losses from the control element, and determines whether to use the corrected heat rate or the original heat rate for a temperature calculation based on the current density of the fuel cells.

30. The fuel cell system according to claim 29 wherein the electronic control module calculates an energy in the control element based on the determined heat rate over the time interval, calculates a temperature increase of the control element based on the energy in the control element, and calculates the temperature of the control element based on the temperature increase.

31. The fuel cell system according to claim 30 wherein the electronic control module calculates the temperature increase of the control element by dividing the energy in the control element by the product of the mass of the control element times the specific heat of the control element.

32. The fuel cell system according to claim 29 wherein the electronic control module calculates the original heat rate of the fuel cell stack by subtracting the average voltage from the theoretical voltage and then multiplying the current density and an active area of the fuel cells by the subtracted value.

33. The fuel cell system according to claim 29 wherein the electronic control module scales the original heat rate by multiplying the original heat rate by a first predetermined value if the start temperature is greater than a first predetermined temperature, but less than a second predetermined temperature, multiplies the original heat rate by a second predetermined value if the start temperature is greater than the second predetermined temperature and multiplies the original heat rate by one if the temperature signal is less than the first predetermined temperature.

34. The fuel cell system according to claim 33 wherein the electronic control module uses the corrected heat rate if the average current density is below a predetermined current density and uses the original heat rate if the average current density is greater than the predetermined current density.

35. The fuel cell system according to claim 28 wherein the electronic control module calculates the theoretical voltage of the fuel cell stack using a low heat value if the stored temperature is above a predetermined temperature where the product is water vapor, and uses a high heat value if the start temperature is below the predetermined temperature where the product is liquid water.

36. The fuel cell system according to claim 28 wherein the electronic control module scales the calculated current density if the current density is less than a predetermined value and does not scale the calculated average current density if the current density if above the predetermined value.

37. The fuel cell system according to claim 28 wherein the electronic control module determines if an open circuit voltage of the fuel cell stack has been reached before calculating the theoretical voltage of the fuel cell stack.

38. The fuel cell system according to claim 25 wherein the control volume element is a portion of an MEA, a diffusion media and a bipolar plate in the stack.

* * * * *